US012203194B2

(12) United States Patent
Angelico (10) Patent No.: US 12,203,194 B2
(45) Date of Patent: Jan. 21, 2025

(54) DISTRIBUTOR OF POLYMER FOR SPUNBOND AND/OR MELT-BLOWN TYPE IMPLANT

(71) Applicant: FRATELLI CECCATO MILANO S.R.L, Milan (IT)

(72) Inventor: Giuseppe Angelico, Teramo (IT)

(73) Assignee: FRATELLI CECCATO MILANO S.R.L., Milan (IT)

( * ) Notice: Subject to any disclaimer, the term of this patent is extended or adjusted under 35 U.S.C. 154(b) by 27 days.

(21) Appl. No.: 18/059,539

(22) Filed: Nov. 29, 2022

(65) Prior Publication Data

US 2023/0203715 A1 Jun. 29, 2023

(30) Foreign Application Priority Data

Dec. 16, 2021 (IT) .......................... 102021000031514

(51) Int. Cl.
| | |
|---|---|
| *D01D 4/06* | (2006.01) |
| *B29C 48/695* | (2019.01) |
| *D01D 1/10* | (2006.01) |
| *D04H 3/16* | (2006.01) |

(52) U.S. Cl.
CPC ............ *D01D 4/06* (2013.01); *B29C 48/695* (2019.02); *D01D 1/106* (2013.01); *D04H 3/16* (2013.01)

(58) Field of Classification Search
CPC . D01D 1/106; D01D 4/06; D04H 3/16; B29C 48/695; B29C 48/70; B29C 48/705
See application file for complete search history.

(56) References Cited

U.S. PATENT DOCUMENTS

| | | | | |
|---|---|---|---|---|
| 3,938,925 A | * | 2/1976 | Lees ..................... | B29C 48/693 425/464 |
| 5,650,067 A | * | 7/1997 | Wilken-Trenkamp ...................... | B29C 48/693 425/197 |
| 2020/0181805 A1 | * | 6/2020 | Angelico ................. | D01D 4/06 |

FOREIGN PATENT DOCUMENTS

WO 2020115620 A1 6/2020

OTHER PUBLICATIONS

Italian Search Report for corresponding Italy Application No. IT202100031514 filed Dec. 16, 2021.

* cited by examiner

*Primary Examiner* — Xiao S Zhao
*Assistant Examiner* — Joseph S Leyson
(74) *Attorney, Agent, or Firm* — Vorys, Sater, Seymour and Pease LLP (57) ABSTRACT

Distributor of polymeric filament for spunbond and/or melt-blown type implant expanding along a main plane between a first interface side, to be coupled with an extrusion head, and a second interface side, to be coupled with a spinneret. Including distribution holes distributed within an extrusion area defined on the first side parallel to the main plane, extending along respective secondary axes transverse to the main plane from the first to the second side. Each defining a countersink converging from the first to the second side and delimited by perimetrical edges at the first side. Each perimetrical edge of a given hole is at least partially coincident with part of the perimetrical edges of other holes positioned around the given hole to realise a distribution surface, defined by the whole of the areas enclosed by the perimetrical edges, at least 80% of the extrusion area.

13 Claims, 5 Drawing Sheets

DISTRIBUTOR OF POLYMER FOR SPUNBOND AND/OR MELT-BLOWN TYPE IMPLANT

FIELD OF THE INVENTION

The present invention relates to a distributor of polymeric filament for spunbond and/or melt-blown type plant.

In other words, the present invention has as its object a distributor, also known as a breaker plate, capable of distributing polymer within a plant for making extruded polymeric filaments intended to obtain, in a direct or indirect manner, non-woven fabric.

BACKGROUND OF THE INVENTION

As is well known, the non-woven fabric, or TNT, is an industrial product similar to a fabric but obtained by processes other than weaving and knitting. Therefore, within a non-woven fabric, the fibres present a random pattern, with no ordered structure identified, whereas in a woven fabric, the fibres present two prevailing and orthogonal directions, usually called warp and weft.

At present, a plurality of products containing TNT are produced, depending on the manufacturing technique used, which is mainly connected to the use of the product itself.

A distinction is made, in particular, between the high quality non-woven fabrics for hygienic products and low quality non-woven fabrics used mainly for geotex.

From a technical point of view, the TNT fabrics, also known by the anglophone term non-woven fabric, can basically be divided into spunlace, spunbond and melt-blown.

The spunlace fabric undergoes processing that gives the material equidirectional strength. Thanks to this property, to the possibility of being produced in different materials such as viscose, polyester, cotton, polyamide and microfibre, to the two possible finishes, i.e. smooth or perforated, and to the multitude of smooth or printed colours, spunlance is suitable for the hygienic-sanitary sector, as well as for the automotive, cosmetic, industrial or disposable sectors.

The spunbond, usually made from polypropylene, is a non-woven fabric with many applications in the agricultural, sanitary, construction, furniture, mattress and other related sectors. Through appropriate treatment, a series of highly specific products can be produced for each sector: fluorescent, soft calendered, anti-mite, flame retardant, antibacterial, anti-static, anti-UV and others. Numerous finishes such as printed, laminated, flexo-printed and self-adhesive can also be applied to the spundbond.

The spundbond non-woven fabric production facilities essentially include at least one polymer input duct, a polymer extrusion head, a polymer distributor or breaker plate, and a spinneret to make the actual spunbond yarn that is deposited on a conveyor belt.

These elements are each arranged consequently and adjacent to each other in such a way as to allow the polymer to be processed and the TNT spunbond to be distributed.

More in detail, the polymer inside the feeding duct is pushed under pressure and at a high temperature, usually above 200° C., towards the extrusion head. In this regard, a pressure control, e.g. by means of a pressure switch, is usually carried out to guarantee the continuity of the yarn at the outlet and the precision of the deposition process.

The extrusion head distributes the polymer along a distribution surface through which the melted polymer reaches the distributor. Between the distributor, or breaker plate, and the extrusion head is a filter consisting of a steel foil with a thickness usually varying between 0.8 and 1.6 mm and including fine meshes with a nominal size between 20 and 110 μm. Essentially, therefore, the above-mentioned filter is a stretched mesh.

Following the passage through the filter, the melted polymer enters the distributor that accompanies the polymer to the spinneret where the polymer is extruded into filaments constituting the TNT spundbond.

More specifically, the filter has the purpose of blocking particles or pigments of polymer, which are not perfectly melted or in any case bigger, and which entering the spinneret could obstruct the extremely small TNT extrusion holes.

The melt-blown TNT is produced by means of specific spinneret in order to achieve higher technical characteristics than previous TNT. In fact, melt-blown fabric is characterised by fibres with high filtering power for both liquid and aeriform substances.

The production plants for melt-blown non-woven fabrics consist of a cassette that encloses the melt-blown fibre making device and all the parts that are necessary for the process to work at its best. The known equipment also includes an extrusion head and a distributor, and an air knife.

The extrusion head and distributor basically have the same characteristics as the extrusion head and distributor used in spunbond technology and include a filter to sift the incoming polymeric fluid. However, the melt-blown devices usually already include a spinneret within the distributor to channel the polymeric filaments towards the support.

The support serves to direct the polymeric filament towards the air blade and is arranged in such a way as to direct the filaments from the breaker plate towards a hole in a cusp.

The air blade, on the other hand, consists of a casing that wraps around the cusp of the melt-blown device in such a way as to direct a flow of air, possibly non-turbulent, towards the hole in the cusp.

The known technique described involves some major drawbacks.

In particular, the distributors present in spunbond or melt-blown polymeric filament making plants define a distribution surface, defined by the distribution holes, that is limited in relation to the overall extent of the distributor.

Therefore, the filter is easily and very quickly clogged as at least part of the polymer conveyed to the distributor sits on it before being conveyed to the spinneret.

In particular, this functional drift is extremely relevant for dark-pigmented polymers whose particles are, to begin with, larger in size than those of lighter colours.

Furthermore, the common plants that adopt the filter described risk exploding due to pressure increases inside the extrusion head resulting from the accumulation of polymer.

This drawback, as well as being obviously relevant in terms of safety, is also relevant in terms of the efficiency and costs of the plant which, when subjected to overpressure, must necessarily be stopped for cleaning or replacement of the filter itself.

SUMMARY OF THE INVENTION

In this situation, the technical task at the basis of the present invention is to devise a polymeric filament distributor for spunbond and/or melt-blown type plant capable of substantially obviating at least part of the aforementioned drawbacks.

In the context of said technical task, it is an important scope of the invention to obtain a polymeric filament distributor for spunbond and/or melt-blown type plant which prevents the polymer from stationing on the distributor resulting in clogging of the filter.

A further important object of the invention is to achieve a polymeric filament distributor for spunbond and/or melt-blown type plant which significantly increases the total dispensing surface area so as to prevent the formation of stagnation surfaces.

In conclusion, a further task of the invention is to realise a polymeric filament distributor for spunbond and/or melt-blown type plant which allows effective spacing of filter and distribution holes so as to avoid overpressure within the plant.

The specified technical task and purposes are achieved by a polymeric filament distributor for spunbond and/or melt-blown type plant as claimed.

Preferred technical solutions are highlighted in the claims.

BRIEF DESCRIPTION OF THE DRAWINGS

The features and advantages of the invention are hereinafter clarified by the detailed description of preferred embodiments of the invention, with reference to the appended drawings, in which:

the FIG. 1 illustrates a view from above, i.e. from the point of view of the extrusion head, of part of a distributor of polymeric filament for spunbond and/or melt-blown type plant according to the invention;

the FIG. 2 illustrates a view from below, i.e. from the point of view of the die, of part of a distributor of polymeric filament for spunbond and/or melt-blown type plant according to the invention;

the FIG. 3 is a top view of a distributor of polymeric filament for spunbond and/or melt-blown type plant according to the complete invention; and the FIG. 4 illustrates a cross-sectional view along cross-section IV-IV of FIG. 3 of a part of a distributor of polymeric filament for spunbond and/or melt-blown type plant according to the invention;

the FIG. 5 depicts a cross-sectional view of an embodiment of a spunbond type polymeric filament making plant including a cross-sectional view along cross-section IV-IV of FIG. 3 of a distributor of polymeric filament for spunbond and/or melt-blown type plant according to the invention with a extrusion head on a first side of the distributor and a spinneret on a second side of the distributor, and further having a seat arranged at the first side;

the FIG. 6 is a cross-sectional view of a spunbond and/or melt-blown type polymeric filament making plant including a distributor of polymeric filament for spunbond and/or melt-blown type plant according to the invention;

the FIG. 7 shows a schematic view of the distribution surface defined by a distributor polymeric filament for spunbond and/or melt-blown type plant according to the invention;

the FIG. 8 illustrates a schematic perspective view of the distribution surface defined by a distributor of polymeric filament for spunbond and/or melt-blown type plant according to the invention; and the FIG. 9 illustrates a schematic view of the distribution surface defined by a polymeric filament for spunbond and/or melt-blown type plant according to the known invention.

DETAILED DESCRIPTION OF PREFERRED EMBODIMENTS OF THE INVENTION

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

With reference to the Figures, the distributor of polymeric filament for spunbond and/or melt-blown type plant according to the invention is globally referred to as number 1.

The distributor 1 is substantially a device configured to distribute polymer, preferably in a fluid state, through a plurality of openings.

The distributor device 1 is further preferably included within an plant for making polymeric filament, or rather non-woven fabric, of the spunbond or melt-blown type.

The plant is preferably configured for non-woven fabrication based on spunbond or melt-blown technology or both in a combined manner. The latter, as is well known, involves extruding the melt-blown polymeric material by means of a plurality of holes of nominal micrometer size to distribute the polymeric filaments directed towards a conveyor belt or to introduce the polymeric filaments inside a hole in a cusp in contact with one or more air blades.

The cited technique is in any case widely known.

Preferably, the distributor 1 is, in fact, intended to perform the same functions as at least some of the common spunbond and melt-blown plant and is configured to receive and distribute the polymeric material, preferably fluid, in the form of a polymeric filament, as in the known technique.

In detail, the polymeric fluid may be for example a choice of polypropylene, polyester, nylon, cellulose, polyester and viscose.

In particular, the distributor 1 is essentially a device known in the art as a breaker plate. Thus, the distributor 1 is mainly developed along a main plane 1a.

In other words, the distributor device 1 is essentially an elongated element, for example a bar in which two dimensions prevail over the third dimension, normal to the main plane 1a.

Figure 1:
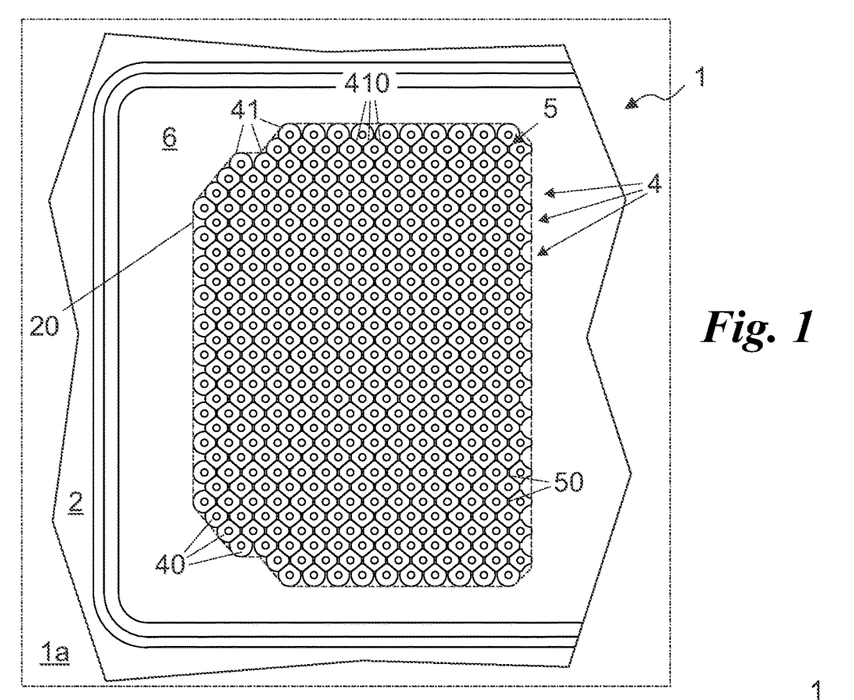
Figure 2:
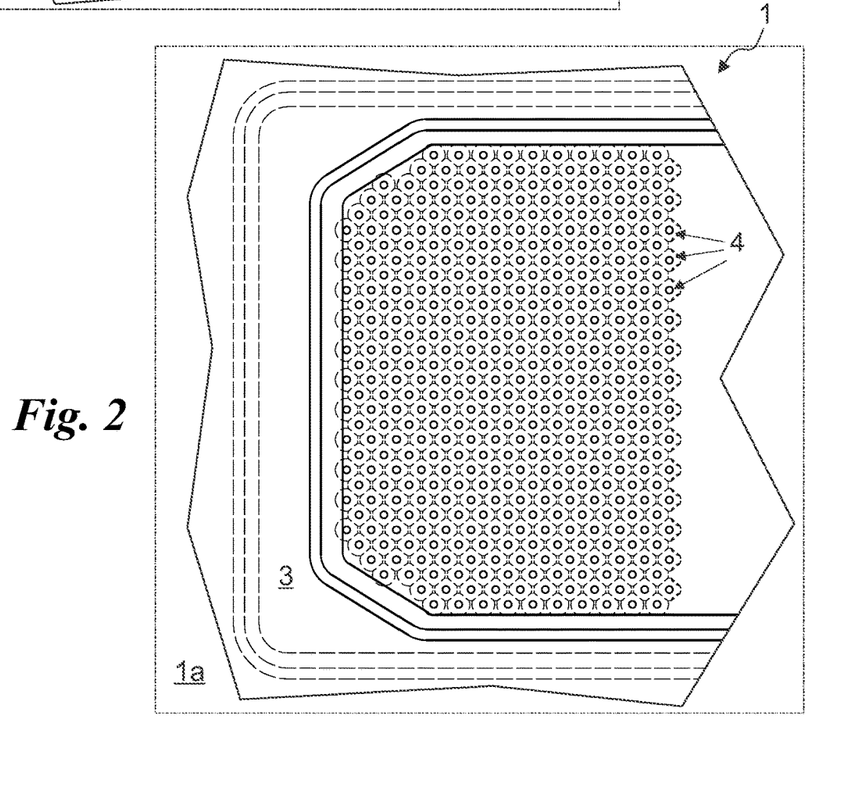
Figure 3:
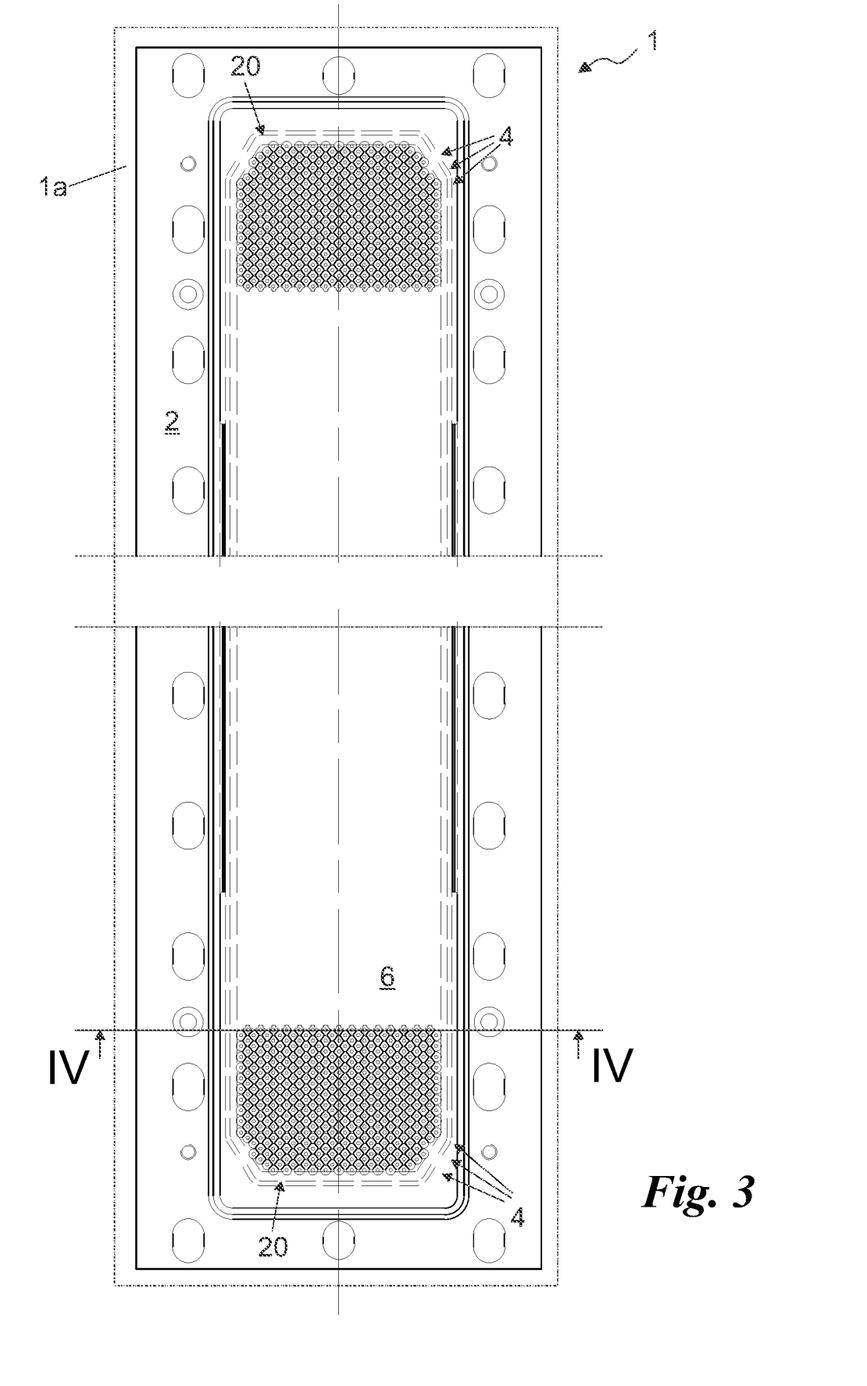
Figure 4:
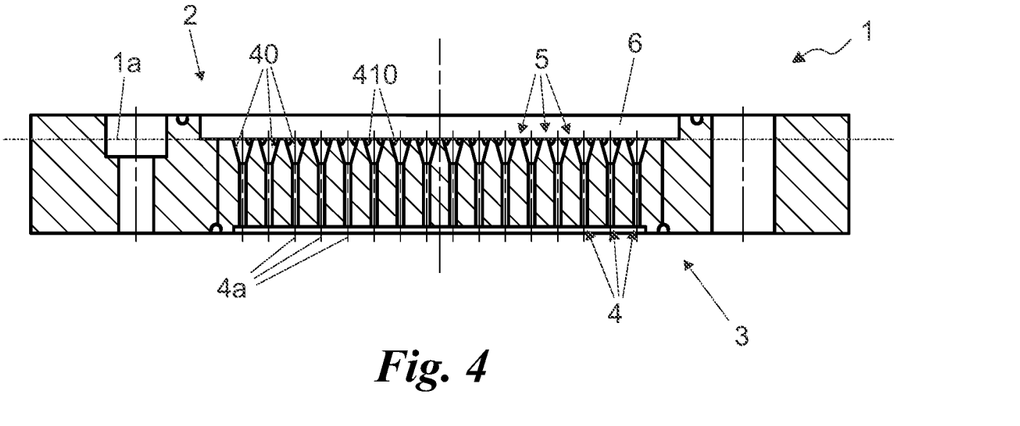

Even more in detail, the distributor 1 extends along a main plane 1a between a first side 2 of interface as seen in FIG. 1 and a second side 3 of interface as seen in FIG. 2.

The distributor 1 thus defines a thickness between the first side 2 and the second side 3, transverse to the main plane 1a.

Figure 5:
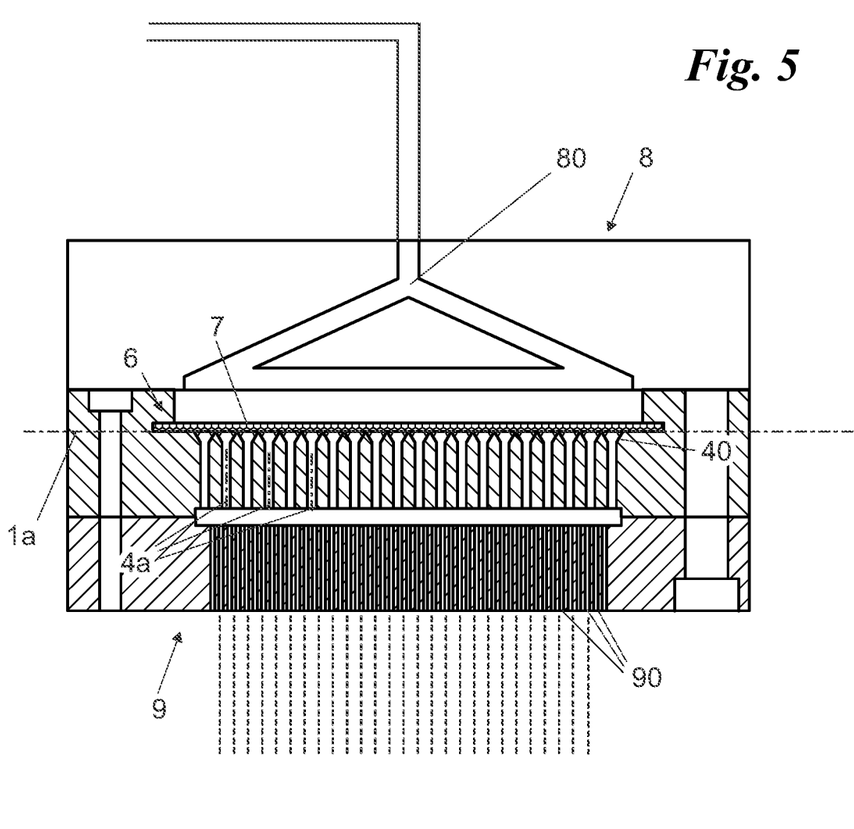
Figure 6:
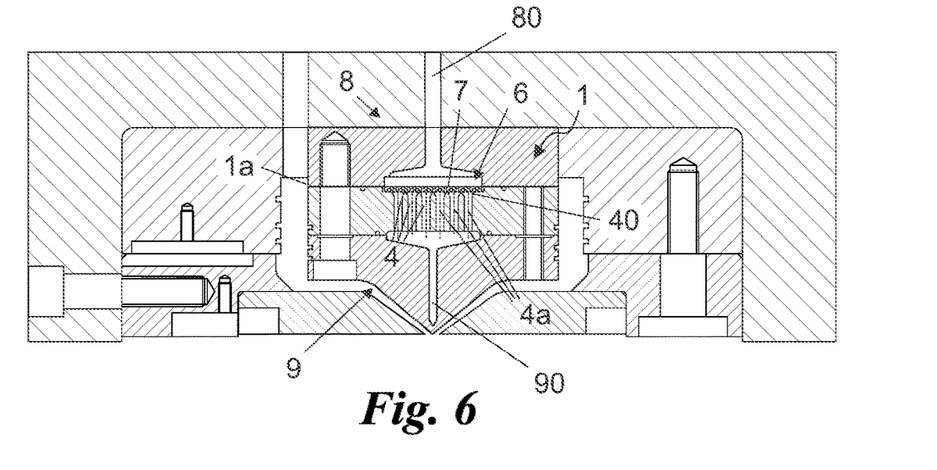
Figure 7:
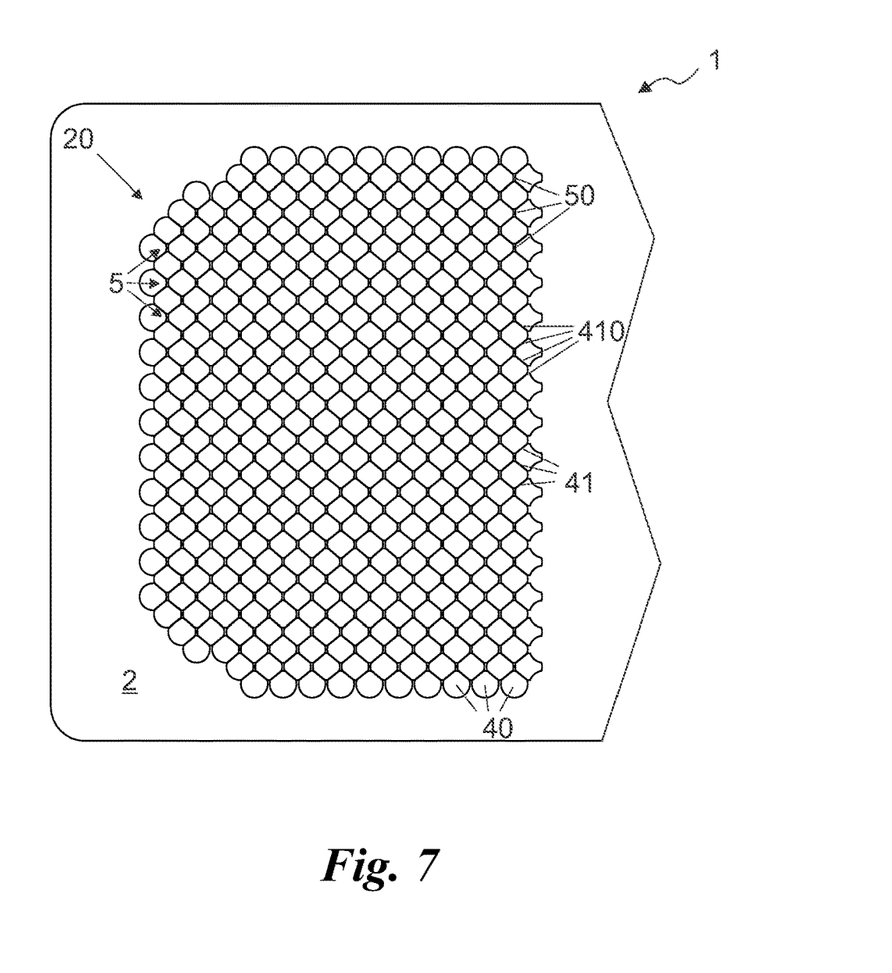

The first side 2 is therefore suitable to be coupled with an extrusion head 8, when the distributor 1 is in use in a polymeric filament fabrication plant as seen in FIG. 5.

The extrusion head 8 is preferably substantially an ordinary extrusion head, for example known as a coat-hanger. The distributor 1 is adapted to interact with the extrusion head 8.

Preferably, the extrusion head 8 is capable of directing a polymeric fluid to the distributor 1. Therefore, preferably, the extrusion head 8 includes at least one conveying conduit 80.

The conveying conduit 80 is an opening or passageway of any shape and size, and may therefore be cylindrical or square compatible with the other elements to which the conveying conduit 80 interfaces.

The conveyor duct 80 is preferably suitable for allowing polymeric fluid to pass through the extrusion head 8. In particular, the conveying conduit 80 is suitable for conveying the polymeric fluid to the distributor 1.

The distributor 1 can therefore be detachably constrained to the extrusion head 8 with conventional couplings such as, for example, screws and bolts or other resolvable joints, or even magnetic connectors as long as they are capable of permitting stable constraint between the extrusion head 2 and the distributor 1.

The second side 3 is, on the other hand, suitable to be coupled with a spinneret 9, when the distributor 1 is in use in a polymeric filament manufacturing plant.

The spinneret 9 preferably comprises a plurality of dispensing conduits 90. Such dispensing conduits 90 are preferably configured to receive polymeric fluid from the dispenser 1 and to extrude polymeric filaments.

Appropriately, the dispensing conduits 90 have diameters that may vary dimensionally depending on the use for which they are intended.

For example, the dispensing conduits 90 for a spunbond system are preferably smaller in size than the dispensing conduits 90 of a melt-blown system.

The spinneret 9 can therefore be detachably constrained to the dispenser 1 with conventional couplings such as, for example, screws and bolts or other resolvable joints, or even magnetic connectors as long as they are suitable to allow stable constraint between the die 9 and the dispenser 1.

The distributor 1 is thus configured to convey polymeric fluid from the extrusion head 2 to the spinneret 9.

Thus, the distributor 1 comprises a plurality of distribution holes 4 as seen in FIGS. 1-4. The holes 4 are preferably perforations or channels capable of placing in fluid passage connection the conveying conduit 80 and the dispensing conduits 90 as seen, for example, in FIG. 5.

In this regard, they may split and provide sub-channels for distribution of the polymeric fluid. In other words, the distributor 1 includes a plurality of holes 4 arranged downstream of the conveying conduit 80 and suitable, each, for distributing smaller amounts of polymeric fluid than the conveying conduit 80.

The holes 4, in particular, are distributed on the distributor within an extrusion area 20 as seen in FIG. 1.

The extrusion area 20 is essentially an area defined on the first side 2 parallel to the main plane 1a that encloses all the holes 4. Hence, the holes 4 are distributed within the extrusion area 20. The extrusion area 20 is therefore the distributor area 1 suitable for receiving polymeric fluid from the extrusion head 8, in detail from the conveyor duct 80, in order to allow its distribution to the spinneret 9.

Preferably, the holes 4 pass from side to side the distributor 1 transversely to the main plane 1a.

Then, the holes 4 extend along respective secondary axes 4a.

The secondary axis 4a is substantially transverse to the main plane 1a. In detail, the secondary axis 4a may be normal to the main plane 1a.

The holes 4 also extend from the first side 2 to the second side 3, or vice versa. In other words, the holes 4 are passing from first side 2 to second side 3.

Each hole 4 defines a countersink 40 adjacent to the first side 2.

The countersink 40 is preferably convergent from the first side 2 towards the second side 3. Therefore, the countersink 40 may extend along the entire extent of the hole 4 along the secondary axis 4a, or it may define only part of the hole 4. In the preferred embodiment, the hole 4 defines a countersink 40 adjacent to the first side 2 terminating in a substantially cylindrical, constant section portion of the hole 4 extending from the countersink 40 to the second side 3.

The cylindrical cross-section of the hole 4 may, in particular, for example, define diameters of cross-section approximately parts to 2 mm.

Furthermore, in more detail, the countersink may define particular angles. For example, the countersink 40 may define countersink angles, determined by the inclination of the walls of the countersink 40 with respect to the secondary axis 4a, between 27° and 37°. More specifically, the flaring angle could be between 30° and 33°, for example 31.5°.

The countersink 40 is, in addition, delimited by perimetrical edges 41.

In particular, the countersink 40 is bounded by perimetrical edges 41 at the first side 2. Thus, the edges 41 are substantially defined by the end or extreme part of the countersink 40 at the first side 2.

Advantageously, each perimetrical edge 41 of a given hole 4 is at least partially coincident with part of the perimetrical edges 41 of the other holes 4 positioned around the given hole. In other words, as evident from FIG. 1, the perimetrical edges 41 also define the demarcation lines, or boundaries, between each countersink 40 of adjacent holes 4.

For example, if the countersink 40 defines perimetrical edges 41 having a nearly square shape with chamfered vertices, then straight portions of the sides are common between the countersinks 40 of two adjacent holes 4. Thus, a hole 4 surrounded by four holes 4 may share one side of the perimetrical edge 41 with each of the perimetrical edges of the other holes 4.

The perimetrical edges 41, by delimiting the countersink 40, essentially define areas enclosed therein which, collectively, define a distribution surface. Therefore, the distribution surface is defined by the whole of the areas enclosed by the perimetrical edges 41 and can be defined as the surface useful to allow the polymeric fluid to flow, i.e. without stagnation zones.

The distribution surface realised by the perimetrical edges 41 as defined is advantageously greater than or equal to 80% of the extrusion area 20.

More specifically, the distribution area can also be greater than or equal to 90%, appropriately even 95%.

This means that most of the extrusion area 20 is exploited to be able to distribute the polymeric fluid through the distributor 1.

Furthermore, the distributor 1 could comprise further components.

For example, the distributor 1 could comprise protuberances 5.

If present, the protuberances 5 are essentially protuberant elements parallel to the secondary axes 4a from the first side 2.

Even more in detail, the protuberances 5 are each defined by the meeting of the perimetrical edges 41 between four holes 4, i.e. in the area of intersection of the respective perimetrical edges 41. Furthermore, each protuberance 5 preferably defines a bearing surface 50.

The bearing surface 50 is substantially a portion of the protuberance suitable for supporting an external object. In particular, the bearing surface 50 may correspond to a zone of maximum protuberance 5, i.e. a zone in which the protuberance 5 protrudes most from the first side 2.

The bearing surface 50 may therefore be a curved surface, or more preferably a flat surface parallel to the main plane 1a.

Of course, each bearing surface 50 defines its own extension. Thus, the bearing surfaces 50 may define, in total, a stagnation surface, substantially complementary to the distribution surface with respect to the total extrusion area 20.

The stagnation surface is preferably less than 20% of the extrusion area 20. More specifically, the stagnation surface could be less than 10%, even more suitably, less than 5% of the extrusion area 20.

Of course, each bearing surface 50 could also define a near-zero extension and be defined by a meeting point of the perimetrical edges 41.

In other words, altogether, the perimetrical edges 41 could define a kind of grid whose intersections define the protuberances 5.

In addition, the perimetrical edges 41 may be realised in particular ways.

Figure 8:
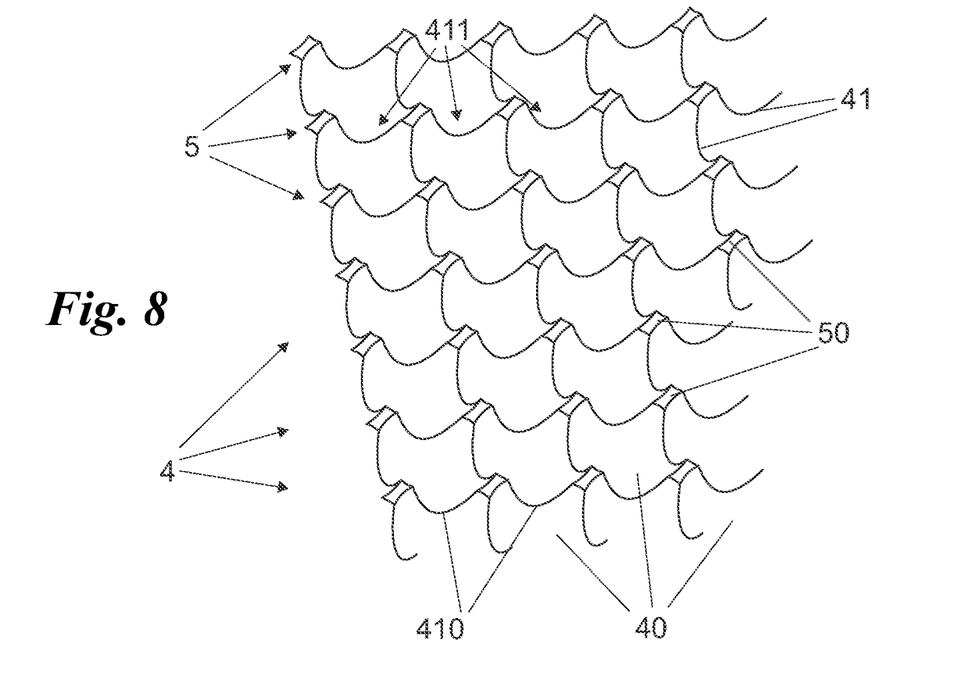
Figure 9:
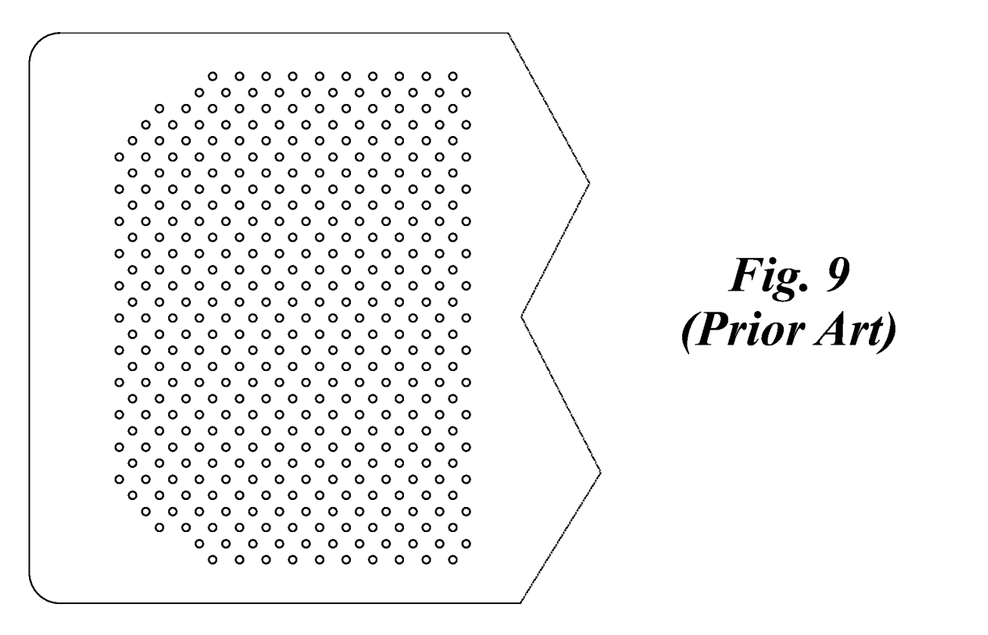

In the preferred form of realisation, shown schematically in FIG. 8, the perimetrical edges 41 may define, in areas where they coincide with another perimetrical edge 41, a connector 410.

The connector 410 thus runs between two protuberances 5 and, in fact, connects them.

The connector 410, even more in detail, is cusped shape. This means that the perimetrical edge 41 is, in the area defined by the connector 410, substantially realised by the meeting of the walls of the countersinks 40 of the intersecting adjacent holes 4. More specifically still, the connectors 410 are curved. Thus, preferably, the fittings 410 define concavities 411 between each of the protuberances 5. Thus, the fittings 410 are developed below the plane joining the protuberances 5 parallel to the main plane 1a.

These concavities 411 allow any objects resting on the bearing surfaces 50 to be kept spaced apart from the countersinks 40 so that there can be no obstruction of the area immediately upstream of the holes 4.

Basically, the concavities define slots having a wedge shape and therefore having a maximum thickness defined parallel to the secondary axis 4a.

In other words, the thickness is defined by the area where the connection 410 is furthest away from a plane joining the bearing surfaces 50 along the secondary axis 4a.

Preferably, the thickness is at least 500 μm.

Even more preferably, the thickness is between 500 μm and 5 mm.

Preferably, the distributor 1 further comprises a seat 6.

The seat 6 is substantially arranged upstream of the holes 4. Thus, the seat 6 is preferably arranged at the first side 2. Thus, the seat 6 is in fluid passage connection with the holes 4.

This means that a polymeric fluid fed into the seat 6 can flow into the holes 4 through the flares 40. The latter, in fact, are the peers of hole 4 immediately downstream of seat 6.

The seat 6 is essentially a tank within which a further component may also be placed, as described below. Furthermore, when the distributor 1 is in contact with the extrusion head 8, the seat 6 is adjacent to the extrusion head 2 and arranged between the conveying duct 80 and the holes 4.

The distributor 1 preferably also includes a filter 7.

As already mentioned, the filter 7 is preferably housed in the seat 6.

Thus, the filter 7 is arranged, in general, upstream of the holes 4. In particular, the filter 6 is arranged, in use, between the conveyance duct 80 and the holes 4 in such a way as to filter the polymeric fluid.

The filter 7, in particular, preferably comprises a porous element.

The porous element is substantially structurally similar to a sponge. In this sense, it is not intended that the porous element is a soft, easily deformable element. On the contrary, the porous element is preferably defined in terms of stiffness and hardness by its materials and manufacturing processes.

However, the porous element also includes, like sponges, a plurality of pores that make the porous element itself substantially inhomogeneous and anisotropic.

In particular, preferably, the porous element is an element made by the sintering technique.

The latter, due to the manufacturing process, preferably comprises a plurality of non-rectilinear passageways defining irregular, i.e. non-homogeneous dimensions.

The term dimensions refers to all dimensions that contribute to the volumetric determination of the cavities or pores characterising the porous element.

More in detail, preferably, the filter 7 comprises a plurality of pores, or cavities, defining passage channels when adjacent. In other words, the consequentiality of the pores realises the passage channels for the polymeric fluid.

Furthermore, preferably, each of the pores has a minimum porosity of 18 μm.

As mentioned above, the porous element included in the filter 7 is preferably processed by sintering and, therefore, comprises a plurality of mutually sintered particles of the same material.

The particles may therefore be of any material, as long as they are resistant to the passage of the polymeric fluid. For example, the porous element comprises metallic material.

Furthermore, the sintered particles can be of a different nature.

For example, in a first embodiment, the particles can be either spheres or fragments.

In a second embodiment, the porous element may comprise mutually interwoven, sintered filaments.

In a third embodiment, the porous element may include a first layer and a second layer. These layers are preferably mutually overlapping and include respectively components and filaments as previously described. In detail, preferably, the first layer and the second layer are respectively suitable to be arranged adjacent to the extrusion head 8 and the distributor 1 or are respectively adjacent to the distributor 1 and the extrusion head 2.

Furthermore, sintering in a single layer of both particles and filaments may be provided. The porous element may thus be arranged between the extrusion head 8 and the holes 4, preferably housed in the housing 6.

Preferably, the filter 7 is arranged in the housing 6 resting on the protuberances 5. Then, the protuberances 5 preferably define the bottom of the housing 6 at the first side 2.

Thus, the filter 7 is located resting on the protuberances 5, spaced out from the countersinks 40 by means of the concavities 411, which avoid clogging and allow almost the entire extrusion area 20 to be used for the distribution of the polymeric fluid to the die 9.

In fact, the seat 6 is at least present upstream of the extrusion area 20 so that the filter 7 can interpose itself between the conveying conduit 80 and the extrusion area 20.

The distributor 1, moreover, may include a single seat 6 or may have a plurality of adjacent and mutually separate seats 6.

Preferably, in any case, the porous filter element 7 is counter-shaped apart from the seat 6 and removably arranged within the seat 6.

Therefore, in the case where the housings 6 are multiple, the distributor 1 may comprise a plurality of porous elements, i.e., filter elements 7, which can be introduced as tablets within the appropriate seats 6.

The operation of the distributor 1 of polymeric filament for spunbond and/or melt-blown type plant described above in structural terms is similar to that of ordinary distributors.

However the distributor 1 of polymeric filament for spunbond and/or melt-blown type plant according to the invention achieves important advantages.

In fact, the device 1 avoids the clogging of the seat, and therefore of the filter, by shattering, as mentioned above, most of the polymeric particles passing through the porous element and avoiding that these particles stay at the stagnation surfaces.

In fact, the latter have an extremely limited extension and the distribution surface is so large that the fluid is constantly conveyed.

Furthermore, the conformation of the connectors 410 makes it possible to define slots or gaps between the holes 4 and the filter 7 which further enhance the efficiency of the distributor 1, avoiding overpressure inside the distributor 1 and therefore the system.

Therefore, a further advantage is given by the fact that the maintenance costs of the plant are significantly reduced, both in terms of money and time, increasing the efficiency and safety of the plants in which the dispensers 1 are installed.

The invention is susceptible to variations within the scope of the inventive concept as defined by the claims.

Within this scope, all details are substitutable by equivalent elements and the materials, shapes and dimensions can be any.

The invention claimed is:

1. A distributor of polymeric filament material for spunbond and/or melt-blown plant, the distributor expanding along a main plane between a first side of interface, able to be coupled with an extrusion head, and a second side of interface, adapted to be coupled with a spinneret, and comprising a plurality of distribution holes distributed within an extrusion area defined on said first side parallel to said main plane, extending along respective secondary axes transverse to said main plane from said first side to said second side and each defining a countersink converging from said first side towards said second side is delimited by perimetrical edges in correspondence with said first side,
   wherein each perimetrical edge of a given hole of the holes is at least in part coincident with part of said perimetrical edges of other ones of the holes positioned around said given hole so as to create a distribution surface, defined by a set of areas enclosed by said perimetrical edges, greater than or equal to 80% of said extrusion area,
   comprising a plurality of protuberances each defined by a group of said perimetrical edges including four of said holes and each including a bearing surface,
   wherein each of said bearing surfaces is flat and parallel to said main plane, and wherein said bearing surfaces together define a lower stagnation surface at 20% of said extrusion area.

2. The distributor according to claim 1, wherein said perimetrical edges define, in the areas in which coincide with another said perimetrical edge, cusped connectors between each of said protuberances.

3. The distributor according to claim 2, wherein said connectors are curved and define concavities between each of said protuberances.

4. The distributor according to claim 1, wherein said countersink defines a countersink angle between 27° and 37°.

5. The distributor according to claim 1, further comprising:
   a seat arranged in correspondence with said first side in fluid passage connection with said holes, and
   a filter housed in said seat.

6. The distributor according to claim 5,
   wherein said protuberances define a bottom of said seat in correspondence with said first side and said filter rests on said protuberances.

7. The distributor according to claim 6, wherein said perimetrical edges define, in the areas in which coincide with another said perimetrical edge, cusped connectors between each of said protuberances.

8. The distributor according to claim 7, wherein said connectors are curved and define concavities between each of said protuberances.

9. The distributor according to claim 5, wherein said filter comprises a porous element defining a plurality of passages that are not straight and defining irregular dimensions.

10. A plant for making polymeric filament of the spunbond and/or melt-blown type comprising a distributor according to claim 1.

11. The plant according to claim 10, wherein said perimetrical edges define, in the areas in which coincide with another said perimetrical edge, cusped connectors between each of said protuberances.

12. The plant according to claim 11, wherein said connectors are curved and define concavities between each of said protuberances.

13. The plant according to claim 10, wherein said countersink defines a countersink angle between 27° and 37°.

* * * * *